Oct. 19, 1954 — C. S. BRYAN ARANA — 2,691,829
LAND LEVEL
Filed Aug. 15, 1952 — 2 Sheets-Sheet 2
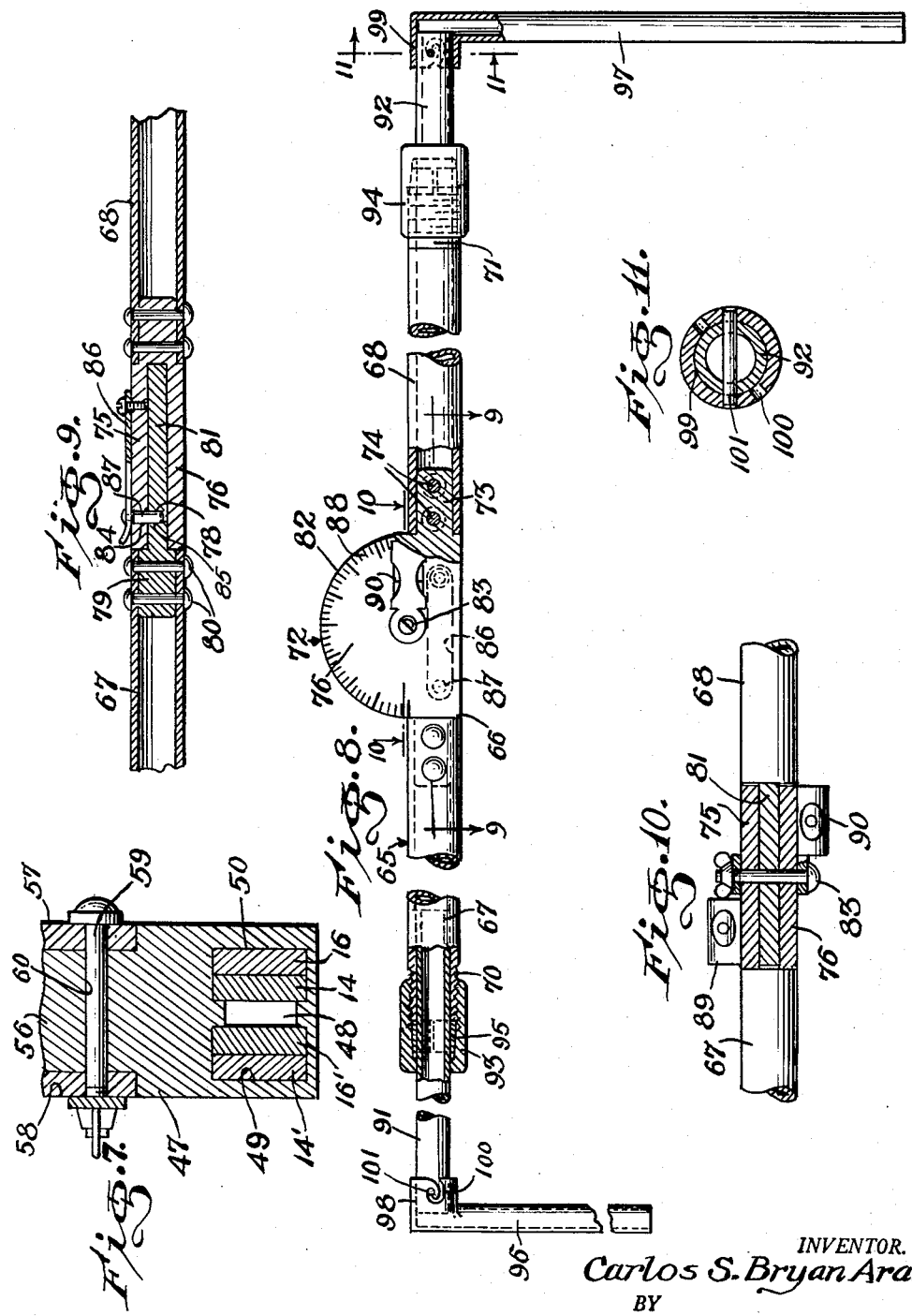
INVENTOR.
Carlos S. Bryan Arana
BY
McMorrow, Berman & Davidson
ATTORNEYS.

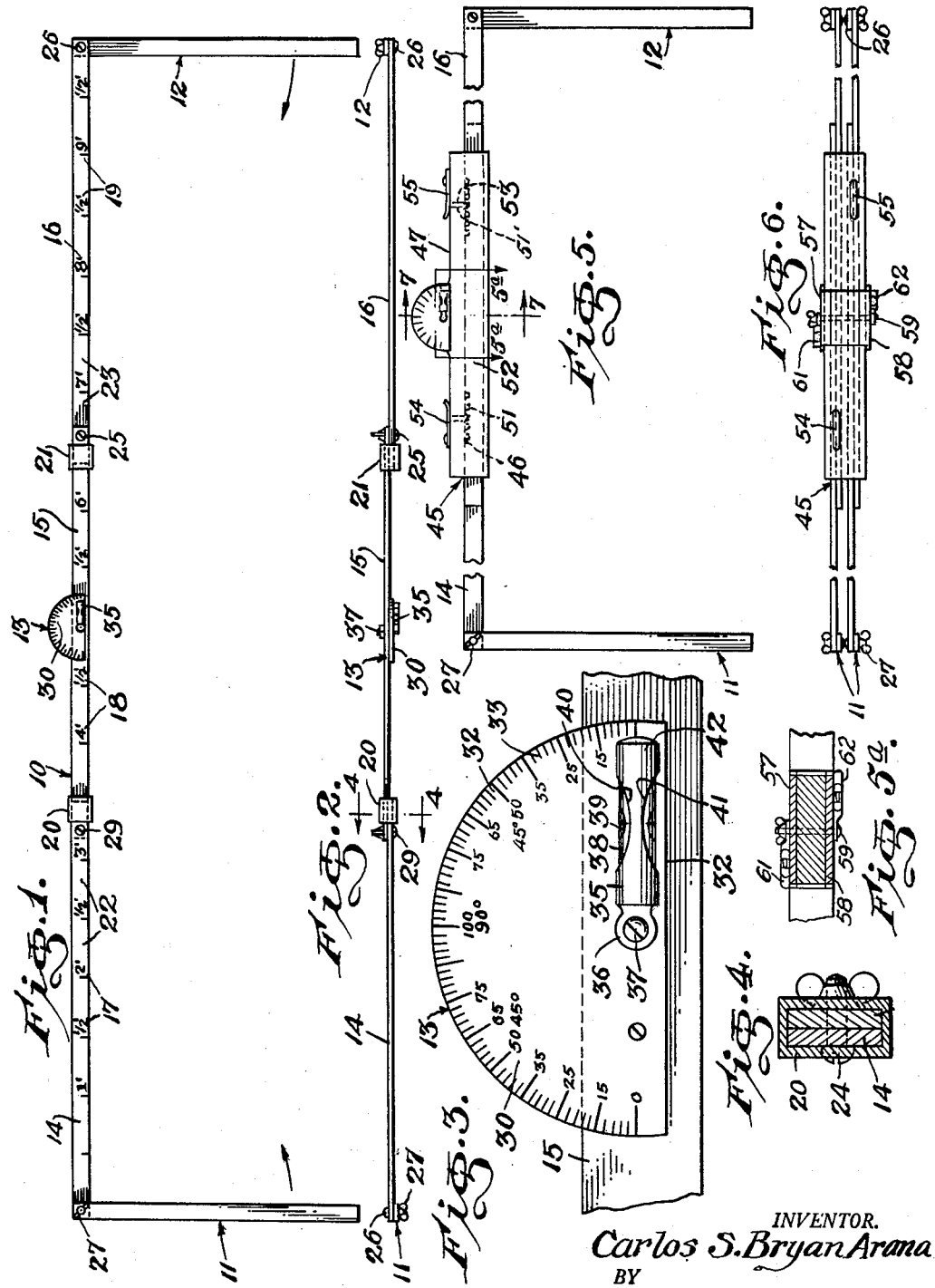

Patented Oct. 19, 1954

2,691,829

UNITED STATES PATENT OFFICE 2,691,829

LAND LEVEL

Carlos S. Bryan Arana, Manati, P. R.

Application August 15, 1952, Serial No. 304,499

2 Claims. (Cl. 33—207)

This invention relates to land or surface levels and more particularly to a portable leveling device effective to measure distances along a surface, such as the surface of the ground, and indicate the slope of the surface along which the distances are measured.

It is among the objects of the invention to provide an improved land level which is foldable to a compact condition for transportation and storage and can be unfolded and adjusted to selected lengths for use; which supports a slope indicating device at a convenient height above the ground for use by the operator; which simultaneously measures the distance along a surface and indicates the slope of the surface along which the distance is measured; which requires only one operator for its use as compared with the two or more operators required for the conventional topographical surveying instruments; which will measure the slope of the surface in either direction without reversing the level; which is light in weight and easy to handle, so that it can be easily used by an operator for a long period of time without causing undue fatigue; and which is simple and durable in construction, economical to manufacture, and accurate and efficient in use.

Other objects and advantages will become apparent from a consideration of the following description and the appended claims in conjunction with the accompanying drawings wherein:

Figure 1 is a side elevational view of a land leveling device illustrative of the invention with the device in unfolded or extended condition;

Figure 2 is a top plan view of the device illustrated in Figure 1;

Figure 3 is a fragmentary side elevational view on an enlarged scale of the middle portion of the device illustrated in Figure 1;

Figure 4 is a transverse cross sectional view on an enlarged scale on the line 4—4 of Figure 2;

Figure 5 is a side elevational view on a reduced scale of a somewhat modified form of land leveling device;

Figure 5a is a sectional view taken on the line 5a—5a of Figure 5;

Figure 6 is a top plan view of the device illustrated in Figure 5;

Figure 7 is a transverse cross sectional view on an enlarged scale on the line 7—7 of Figure 5;

Figure 8 is a side elevational view of a still further modified form of land leveling device, portions being broken away and shown in cross section to better illustrate the construction thereof;

Figure 9 is a fragmentary cross sectional view on the line 9—9 of Figure 8;

Figure 10 is a fragmentary cross sectional view on the line 10—10 of Figure 8; and Figure 11 is a transverse cross sectional view on the line 11—11 of Figure 8.

With continued reference to the drawings, the numeral 10 generally indicates a straight, adjustable length bar, the numerals 11 and 12 generally indicate legs detachably connected each at one end to the bar 10 at the respectively opposite ends of the latter and the numeral 13 generally indicates a slope indicating device on the bar 10 at the midlength location of this bar.

The bar 10 comprises three elements 14, 15 and 16 of flat or elongated rectangular cross sectional shape having straight and substantially parallel side edges and formed of a rigid material of high structural strength, such as steel, Duralumin or bronze. These bar elements 14, 15 and 16 have scales of lineal measurement, as indicated at 17, 18 and 19 thereon and are disposed in side by side relationship with the elements 14 and 16 constituting the end elements and the element 15 constituting the center element of the bar.

Collars 20 and 21 of rectangular cross sectional shape are mounted one on each end bar 14 and 16 and slidably receive the center bar, and the end elements 14 and 16 are disposed at the same side of the center element 15 and are slidable from a position at which they overlap the corresponding end portions of the center element 15 and positions at which they extend longitudinally outwardly from the respectively opposite ends of the center elements to a limiting position in which the ends of the end elements 14 and 16 are adjacent the corresponding ends of the center element 15, as illustrated in Figure 1.

The end elements are provided with holes, as indicated at 22 and 23, extending transversely therethrough at equally spaced apart intervals therealong, and the center element 15 is provided with holes, one at each end thereof. Screws 24 and 25 extend, one through each of the end holes in the center element 15 and selectively through the spaced apart holes in the corresponding end elements 14 and 16 and are provided with wing nuts to secure the end elements in selected positions of longitudinal adjustment relative to the center element 15, so that the bar 10 can be adjusted to a selected length and maintained in its selected length adjustment.

The legs 11 and 12 are straight bars of the same length and may be of the same size, shape and material as the elements of the adjustable length bar 10. These legs each have an aperture adjacent one end thereof and the end elements 14 and 16 of the bar 10 each has an aperture therethrough adjacent its end remote from the center element 15. Bolts, as indicated at 26, extend through registering apertures in the end elements 14 and 16 of the level bar 10 and in the legs 11 and 12 respectively, and wing nuts, as indicated at 27, are threaded one onto each of these bolts to secure the legs in adjusted position to the level bar.

When the device is in folded condition, the legs are either detached or are folded closely along the elements of the adjustable length level bar, which elements are then disposed in mutually overlapping relationship and, when the device is unfolded for use, the end elements 14 and 16 of the bar 10 are moved outwardly of the center element 15 and secured in selected positions of longitudinal adjustment relative to the center element, as indicated above, and the legs 11 and 12 are brought to a position at which their longitudinal center lines are perpendicular to the longitudinal center line of the bar 10 and are disposed in a common plane which also includes the longitudinal center line of the bar 10. When the end elements 14 and 16 are moved outwardly relative to the center element 15 they are held in longitudinal alignment with the center element, so that the center lines of the elements 14, 15 and 16 together constitute a straight, common center line of the adjustable length bar.

The slope or grade indicating device 13 comprises a protractor 30 of semicircular shape having a straight edge 31 and an arcuately curved edge 32 and a graduated face disposed parallel to the plane containing the longitudinal center lines of the bar 10 and the legs 11 and 12 and provided with scales 33 of angular measurement around the curved edge thereof.

The protractor preferably carries both degree and grade percentage scales so arranged that the scales begin with a zero mark near the opposite ends of the curved edge of the protractor and the hundred percent mark of the grade percentage and the ninety degree mark is at the center of the curved edge. The straight edge 31 of the protractor is parallel to the longitudinal center line of the bar 10 and the median radius of the protractor extending from the center of curvature of the curved edge 32 to the hundred percent and ninety degree mark is disposed substantially perpendicular to the longitudinal center line of the bar 10 and extends from the center bar 10 in a direction opposite that in which the center lines of the legs 11 and 12 extend from the center line of the bar.

A tubular shield 35 is disposed at the outer side of the protractor 30 and is pivotally mounted at one end on the protractor at the center of curvature of the curved edge 32 of the protractor by suitable means, such as the eye formation 36 on the corresponding end of the shield and the screw 37 extending through the eye formation 36 and a hole in the protractor. A spirit level tube 38 of transparent material is mounted in the shield 35 and has a bubble 39 visible through a window opening 40 in the shield. The window opening 40 is duplicated at the opposite side of the shield, as indicated at 41, and an index mark 42 is provided on the free end of the shield 35 and cooperates with the scales 33 to indicate the angle between the bar 10 and the horizontal.

In using the device for measuring slopes, with the device in its unfolded or extended condition, as illustrated in Figure 1, the ends of the legs 11 and 12 remote from the bar 10 are placed on the surface to be measured, such as the surface of the ground, and the device is held with the legs in upright and substantially vertical position. The spirit level is then adjusted until the bubble is at the center mark of the level and the angular position of the index mark 42 relative to the adjacent scale of angular measurement is read off and noted. By moving the device along so that the leg at the rear end of the device, in the direction of movement, is placed at the position previously occupied by the front leg, distances can be easily measured along the ground and the slope for each setting of the device can be attained and recorded. If the slope changes from down to up, or vice versa in the direction of movement of the device, it is necessary only to swing the spirit level about its pivotal connection with the protractor from the scale in use to the other scale on the protractor.

In using the device for laying out contour lines for strip cropping, drainage ditches, terracing and similar soil conservation practices, with one leg of the extended device at a selected starting point and with the spirit level clamped at zero position on the associated protractor scale, the other leg of the device is moved up or down hill by swinging it about the first leg until a level reading is obtained and the positions of the legs are then staked. The device is then moved so the first leg is positioned adjacent the stake marking the leveling position of the other leg and a new leveling position of the other leg obtained. This new position is staked and the process is repeated until a row of stakes marking the contour line has been provided.

The device may also be set to an adjusted length and used to measure distances for such operations as spacing trees in an orchard or grove.

In the modified arrangement shown in Figures 5, 6 and 7, the legs 11 and 12 and the end elements of the adjustable length bar, generally indicated at 45, are substantially the same as the legs 11 and 12, and the end elements 14 and 16 of the form of the invention illustrated in Figures 1 to 4 inclusive and described above, except in this modified arrangement the legs and end elements are duplicated and disposed in side by side, parallel relationship and the end elements are provided with teeth or notches, as indicated at 46, in their upper edges.

In the modified arrangement, the center element 47 is, however, entirely different from the center element 15 in the above described form of the invention, and comprises an elongated block of rectangular shape having a H-shaped bore 48 extending longitudinally therethrough to provide spaced apart and substantially parallel slideways 49 and 50 of rectangular cross sectional shape for the paired end elements at the opposite sides of the device.

One pair of end elements, as indicated at 14 and 16, extend slidably through the slideway 50 and project from the opposite ends of the block 47, and the other pair of end elements, as indicated at 14' and 16', extend through the slideway 49 and also project from the correspondingly opposite ends of the center block 47.

The block 47 is provided with apertures, as indicated at 51 and 51', extending from the top surface of the block into the upper sides of the slideways 49 and 50 respectively, and latch pins or dogs 52 and 53 extend slidably through these apertures and have their lower ends in engagement with the teeth 46 in the upper edges of the corresponding end elements of the bar 45. Flat springs, as indicated at 54 and 55, are secured on the upper surface of the center block 47 and bear against the upper ends of the pins 52 and 53 to resiliently hold these pins in engagement with the teeth in the end elements, these springs being manually movable away from the adjacent surface of the center block to release the pins from the teeth in the end elements and permit adjustment of the end elements longitudinally of the center block 47 for adjustably varying the length of the level bar 45.

A semicylindrical formation 56 projects upwardly from the upper surface of the block 47 at the mid-length location of this block and protractors 57 and 58 of semicircular shape are mounted one on each end face of this semicylindrical formation 56. These protractors are provided around their curved edges with scales of angular measurement, as described above, and a bolt 59 extends through an aperture 60 in the formation 56 with its longitudinal center line coaxial with the centers of curvature of the protractors 57 and 58.

Spirit levels 61 and 62 are disposed one against the outer face of each of the protractors 57 and 58 and each has one end pivotally mounted on the bolt 59, as by having on such end an eye formation receiving the adjacent end of the bolt. These spirit levels have index marks on their free ends cooperating with the corresponding protractor scales and are usable either independently or in cooperation with each other in performing various grade and distance measurements in the field, and for other operations.

In the further modified arrangement illustrated in Figures 8, 9, 10 and 11, the device is the same in principle as those illustrated in Figures 1 to 7 inclusive and described above, but is somewhat different in structure.

In the further modified form of the device, the adjustable length bar, generally indicated at 65, has a center element 66 which includes two tube or pipe sections 67 and 68 disposed in longitudinal alignment with adjacent ends spaced apart and their remote ends externally pipe threaded, as indicated at 70 and 71.

A protractor structure, generally indicated at 72, is secured to the pipe section 68 at the end of this pipe section adjacent the section 67 and includes a cylindrical plug 73 received in the corresponding end of the pipe section 68 and secured therein by suitable means, such as the rivets 74 extending through apertures disposed diametrically of the plug and through registering apertures in the pipe section and a bifurcated formation on the end of the plug at the adjacent end of the pipe section 68 providing two spaced apart and parallel protractor bodies 75 and 76 of flat, semicircular shape.

A structure, generally indicated at 78, is secured to the tube or pipe section 67 and includes a plug 79 of cylindrical shape received in the end of the section 67 adjacent the section 68 and secured therein by the rivets 80 spaced apart longitudinally of the section 67 and extending diametrically through the section 67 and the plug 79, and a tongue 81 of flat, semicircular shape extending from the end of the plug 79 at the adjacent end of the section 67 and disposed between the protractor bodies 75 and 76 of the protractor structure 72.

An aperture is provided through the bodies 75 and 76 and the tongue 81 at the center of curvature of the curved edges 82 of the protractor body and a pivot pin or bolt 83 extends through this aperture and pivotally interconnects the tube sections 67 and 68. Apertures 84 and 85 extend transversely through the protractor body 75 and the tongue 81 and are in registry with each other when the tube sections 67 and 68 are in longitudinal alignment with each other. A flat spring 86 is secured at one end to the protractor body 75 and a locking pin 87 is carried by this spring at the other end thereof and is received in the apertures 84 and 85 when these apertures are in registry to releasably lock the connection between the tube sections 67 and 68 with these tube sections in longitudinal alignment.

The protractor bodies 75 and 76 are provided on their outer faces with scales of angular measurement, as indicated at 88, extending around the curved edges of the bodies and spirit levels 89 and 90 are disposed at the outer sides of the protractor bodies 75 and 76 respectively, and each is pivotally connected at one end to the pivot bolt 83 by suitable means, as by having at such end an eye formation receiving the corresponding end portion of the bolt. These spirit levels are angularly movable along the protractor scales to indicate the angle between the center bar 65 of the device and the horizontal, in the manner indicated above.

Tubular sections 91 and 92 having an outside diameter substantially equal to the inside diameter of the sections 67 and 68 are slidably received in the outer ends of the sections 67 and 68 respectively, and project longitudinally from the outer ends of these sections.

Sleeve nuts 93 and 94 are threaded onto the screw thread formations 70 and 71 respectively, at the outer ends of the sections 67 and 68 and surround the sections 91 and 92. Tapered wedging sleeves, as indicated at 95, are disposed one within each of the nuts 93 and 94 in surrounding relationship to the corresponding sections 91 and 92 to frictionally lock the sections 91 and 92 in adjusted position relative to the sections 67 and 68 when the nuts are tightened on the corresponding screw threaded formations 70 and 71. The lever bar 65 can thus be adjusted as to length and its relatively movable elements locked in selected positions of longitudinal adjustment relative to each other.

The legs 96 and 97 of this form of the device are tubular sections of the same length and each has on one end a hollow, cylindrical socket, as indicated at 98 and 99 respectively, extending laterally from the corresponding leg with its longitudinal center line perpendicular to the longitudinal center line of the leg and being open at its end remote from the leg. The sockets 98 and 99 receive the outer ends of the tube sections 91 and 92 respectively, and the sockets are provided with bayonet slots, as indicated at 100, extending inwardly from the outer, open end of each socket at diametrically opposite locations thereround. Studs or pins, as indicated at 101, are secured on the tube sections 91 and 92 near the outer ends of these sections and at diametrically opposite locations thereround and these studs are received in corresponding bayonet slots to releasably lock the legs 96 and 97 to the outer ends of the end sections 91 and 92 of the adjustable length level bar 65.

The bayonet slots and studs are so arranged that both of the legs 96 and 97 will have their longitudinal center lines disposed perpendicular to the longitudinal center line of the level bar 65 and substantially in a common plane which also includes the longitudinal center line of the bar 65, and the tube sections 91 and 92 are rotationally adjusted in the corresponding inner tube sections 67 and 68, so that the outer faces of the protractor bodies 75 and 76 are parallel to the plane including the longitudinal center lines of the legs and the longitudinal center line of the level bar.

The land level devices illustrated in Figures 5 to 7 inclusive and in Figures 8 to 11 inclusive can be adjusted as to length in the same manner as the device illustrated in Figures 1 to 4 inclusive, and can be used in the same manner to step-off distances along a surface and to indicate the slope of the surface along the line along which the distance is measured.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A land level device comprising a straight adjustable length bar having an intermediate portion, legs detachably secured to said bar one at each end thereof and having the same length, means positioning said legs with their longitudinal center lines perpendicular to the longitudinal center line of said bar and substantially in a common plane which also includes the longitudinal center line of the bar, a protractor mounted on said intermediate portion to remain substantially at the mid-length location of the bar and having a semicircularly curved edge, a face parallel to said plane, a scale of angular measurements extending along said curved edge and a median radius perpendicular to the longitudinal center line of said bar, and a spirit level pivotally mounted at one end on said protractor at the center of curvature of the curved edge of the latter and having on its other end an index mark movable along said scale to indicate the angular interval between said bar and the horizontal.

2. A land level comprising an adjustable length bar having a straight longitudinal center line, legs detachably secured to said bar one at each end thereof and having the same length, means positioning said legs with their longitudinal center lines perpendicular to the longitudinal center line of said bar and substantially in a common plane which also includes the longitudinal center line of the bar, a protractor mounted on said bar substantially at the mid-length location of the bar and having a face parallel to said plane and a semicircularly curved scale of angular measurement thereon with a median radius perpendicular to the longitudinal center line of said bar, and a spirit level pivotally mounted at one end on said protractor at the center of curvature of said scale of angular measurement and having on its other end an index mark movable along said scale to indicate the angular interval between said bar and the horizontal, said adjustable length bar comprising a center element carrying said protractor, end elements extending longitudinally one from each end of said center element and longitudinally slidable relative to the latter, and means carried by said elements releasably locking said end elements in selected positions of longitudinal adjustment relative to said center element.

References Cited in the file of this patent

UNITED STATES PATENTS

| Number | Name | Date |
|---|---|---|
| 847,720 | Barbo | Mar. 19, 1907 |
| 1,450,296 | Lucas | Apr. 3, 1923 |
| 1,489,789 | Ryan | Apr. 8, 1924 |
| 1,586,153 | Hunter | May 25, 1926 |
| 2,234,436 | King | Mar. 11, 1941 |
| 2,332,347 | Schaefer | Oct. 19, 1943 |
| 2,419,451 | Keller | Apr. 22, 1947 |